(12) United States Patent
Gordon

(10) Patent No.: US 8,771,855 B2
(45) Date of Patent: Jul. 8, 2014

(54) ALKALI METAL AQUEOUS BATTERY

(75) Inventor: John Howard Gordon, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 159 days.

(21) Appl. No.: 13/195,431

(22) Filed: Aug. 1, 2011

(65) Prior Publication Data

US 2012/0040274 A1 Feb. 16, 2012

Related U.S. Application Data

(60) Provisional application No. 61/372,763, filed on Aug. 11, 2010.

(51) Int. Cl.
*H01M 2/12* (2006.01)
*H01M 4/36* (2006.01)
*H01M 4/04* (2006.01)

(52) U.S. Cl.
USPC .................... 429/101; 429/82; 429/231.95

(58) Field of Classification Search
USPC ......... 429/101, 199, 499, 112, 321, 322, 320, 429/212, 231.9, 188, 82, 72, 231.95
See application file for complete search history.

(56) References Cited

U.S. PATENT DOCUMENTS

| | | |
|---|---|---|
| 1,501,756 A | 7/1924 | Downs |
| 3,607,417 A * | 9/1971 | McRae et al. ................. 429/405 |
| 3,660,170 A | 5/1972 | Rampel |
| 3,785,965 A | 1/1974 | Welty |
| 3,787,315 A | 1/1974 | Bearden, Jr. et al. |
| 3,788,978 A | 1/1974 | Bearden, Jr. et al. |
| 3,791,966 A | 2/1974 | Bearden |
| 3,929,506 A * | 12/1975 | Leddy et al. .................. 429/199 |
| 3,970,472 A | 7/1976 | Steffensen |

(Continued)

FOREIGN PATENT DOCUMENTS

| | | |
|---|---|---|
| JP | 59-75985 | 4/1984 |
| JP | 5975985 | 4/1984 |

(Continued)

OTHER PUBLICATIONS

Yun, Cho K., International Search Report, PCT App. No. PCT/US2012/036959 (corresponding to U.S. Appl. No. 13/466,844), (Nov. 23, 2012),1-3.

(Continued)

*Primary Examiner* — Kenneth Douyette
(74) *Attorney, Agent, or Firm* — David Fonda

(57) ABSTRACT

A battery cell is described that has an anode made of an alkali metal or alkali metal alloy, an alkali metal conductive membrane, and a cathode compartment that houses a hydrogen evolving cathode and a catholyte. The catholyte has dissolved salt comprising cations of the alkali metal. The battery also includes a zone where hydrogen may vent from the catholyte and a zone where water may transport into the catholyte. The zone where water may transport into the catholyte restricts the transport of ions. The battery may be operated (1) in freshwater where there is low ion-conductivity and (2) in seawater where there is a quantity of cations (such as sodium ions) that are incompatible with the alkali metal conductive membrane. The battery is designed such that the alkali metal conductive membrane is protected from cations that operate to foul the alkali metal conductive membrane.

19 Claims, 5 Drawing Sheets

(56) References Cited

U.S. PATENT DOCUMENTS

| | | |
|---|---|---|
| 4,041,215 A | 8/1977 | Kormanyos et al. |
| 4,053,371 A | 10/1977 | Towsley et al. |
| 4,076,613 A | 2/1978 | Bearden, Jr. |
| 4,182,797 A | 1/1980 | Kondo et al. |
| 4,207,391 A | 6/1980 | Church et al. |
| 4,244,986 A | 1/1981 | Paruso et al. |
| 4,298,666 A | 11/1981 | Taskier |
| 4,307,164 A | 12/1981 | Church et al. |
| 4,372,823 A | 2/1983 | Church et al. |
| 4,465,744 A | 8/1984 | Susman et al. |
| 4,479,856 A | 10/1984 | Ando |
| 4,542,444 A | 9/1985 | Boland |
| 4,546,055 A | 10/1985 | Coetzer et al. |
| 4,623,597 A | 11/1986 | Sapru et al. |
| 4,828,939 A | 5/1989 | Turley et al. |
| 4,842,963 A | 6/1989 | Ross, Jr. et al. |
| 4,937,155 A | 6/1990 | Tokoi et al. |
| 5,057,206 A | 10/1991 | Engel et al. |
| 5,213,908 A | 5/1993 | Hagedorn |
| 5,290,405 A | 3/1994 | Joshi et al. |
| 5,342,709 A | 8/1994 | Yahnke et al. |
| 5,427,873 A * | 6/1995 | Shuster ................. 429/188 |
| 5,516,598 A | 5/1996 | Visco et al. |
| 5,525,442 A | 6/1996 | Shuster |
| 5,541,019 A | 7/1996 | Anani et al. |
| 5,580,430 A | 12/1996 | Balagopal et al. |
| 5,686,201 A | 11/1997 | Chu |
| 5,695,632 A | 12/1997 | Brons et al. |
| 5,780,186 A | 7/1998 | Casey, Jr. |
| 5,856,047 A | 1/1999 | Venkatesan et al. |
| 5,882,812 A | 3/1999 | Visco et al. |
| 5,935,421 A | 8/1999 | Brons et al. |
| 6,017,651 A | 1/2000 | Nimon et al. |
| 6,025,094 A | 2/2000 | Visco et al. |
| 6,030,720 A | 2/2000 | Chu et al. |
| 6,033,343 A | 3/2000 | Licht |
| 6,110,236 A | 8/2000 | Tsang et al. |
| 6,153,328 A | 11/2000 | Colborn |
| 6,159,634 A | 12/2000 | Yen et al. |
| 6,165,644 A | 12/2000 | Nimon et al. |
| 6,200,704 B1 | 3/2001 | Katz et al. |
| 6,210,564 B1 | 4/2001 | Brons et al. |
| 6,210,832 B1 | 4/2001 | Visco et al. |
| 6,225,002 B1 | 5/2001 | Nimon et al. |
| 6,248,476 B1 | 6/2001 | Sun et al. |
| 6,248,481 B1 | 6/2001 | Visco et al. |
| 6,265,100 B1 | 7/2001 | Saaski et al. |
| 6,291,090 B1 | 9/2001 | Kuznetsov et al. |
| 6,310,960 B1 | 10/2001 | Saaski et al. |
| 6,355,379 B1 | 3/2002 | Ohshita et al. |
| 6,358,643 B1 | 3/2002 | Katz et al. |
| 6,368,486 B1 | 4/2002 | Thompson et al. |
| 6,376,123 B1 | 4/2002 | Chu |
| 6,402,795 B1 | 6/2002 | Chu et al. |
| 6,413,284 B1 | 7/2002 | Chu et al. |
| 6,413,285 B1 | 7/2002 | Chu et al. |
| 6,416,903 B1 | 7/2002 | Fierro et al. |
| 6,432,584 B1 | 8/2002 | Visco et al. |
| 6,537,701 B1 | 3/2003 | Nimon et al. |
| 6,610,440 B1 | 8/2003 | LaFollette et al. |
| 6,632,573 B1 | 10/2003 | Nimon et al. |
| 6,737,197 B2 | 5/2004 | Chu et al. |
| 6,787,019 B2 | 9/2004 | Jacobson et al. |
| 6,852,450 B2 | 2/2005 | Hwang et al. |
| 6,881,234 B2 | 4/2005 | Towsley |
| 6,911,280 B1 | 6/2005 | De Jonghe et al. |
| 6,955,753 B1 | 10/2005 | Gomez |
| 6,955,866 B2 | 10/2005 | Nimon et al. |
| 6,991,662 B2 | 1/2006 | Visco et al. |
| 7,070,632 B1 | 7/2006 | Visco et al. |
| 7,144,654 B2 | 12/2006 | LaFollette et al. |
| 7,166,384 B2 | 1/2007 | LaFollette et al. |
| 7,214,443 B2 | 5/2007 | Clarke et al. |
| 7,259,126 B2 | 8/2007 | Gordon et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,432,017 B2 | 10/2008 | Visco et al. |
| 7,482,096 B2 | 1/2009 | De Jonghe et al. |
| 7,491,458 B2 | 2/2009 | Visco et al. |
| 8,012,621 B2 | 9/2011 | Joshi et al. |
| 2,022,270 A1 | 1/2012 | Gordon et al. |
| 2002/0150818 A1 | 10/2002 | Amatucci et al. |
| 2003/0108788 A1 | 6/2003 | Miyoshi et al. |
| 2004/0197641 A1 | 10/2004 | Visco et al. |
| 2004/0229107 A1 | 11/2004 | Smedley |
| 2005/0109617 A1 | 5/2005 | Ono et al. |
| 2005/0175894 A1 | 8/2005 | Visco et al. |
| 2006/0096893 A1 | 5/2006 | De Almeida et al. |
| 2006/0141346 A1 | 6/2006 | Gordon et al. |
| 2006/0177732 A1 | 8/2006 | Visco et al. |
| 2006/0226022 A1 | 10/2006 | Balagopal et al. |
| 2006/0257734 A1 | 11/2006 | Obata et al. |
| 2007/0048610 A1 | 3/2007 | Tsang et al. |
| 2007/0048617 A1 | 3/2007 | Inda |
| 2007/0072067 A1 * | 3/2007 | Symons et al. ............ 429/101 |
| 2007/0154762 A1 | 7/2007 | Schucker |
| 2007/0172739 A1 | 7/2007 | Visco et al. |
| 2007/0221265 A1 | 9/2007 | Affinito et al. |
| 2007/0259234 A1 * | 11/2007 | Chua et al. .................. 429/27 |
| 2007/0259235 A1 | 11/2007 | Jacobson et al. |
| 2008/0268327 A1 | 10/2008 | Gordon et al. |
| 2009/0061288 A1 | 3/2009 | Gordon et al. |
| 2009/0134842 A1 | 5/2009 | Joshi et al. |
| 2009/0136830 A1 | 5/2009 | Gordon |
| 2009/0189567 A1 | 7/2009 | Joshi et al. |
| 2010/0068629 A1 | 3/2010 | Gordon |
| 2010/0239893 A1 | 9/2010 | Gordon et al. |
| 2010/0285372 A1 | 11/2010 | Lee et al. |
| 2011/0104526 A1 | 5/2011 | Boxley et al. |
| 2012/0126752 A1 | 5/2012 | Joshi et al. |
| 2012/0141856 A1 | 6/2012 | Gordon et al. |

FOREIGN PATENT DOCUMENTS

| | | |
|---|---|---|
| JP | 62186470 | 8/1987 |
| JP | 08321322 A | 12/1996 |
| JP | 2001-307709 | 11/2001 |
| JP | 2001307709 | 11/2001 |
| JP | 2002-245847 A | 8/2002 |
| KR | 2004047664 | 6/2004 |
| KR | 100651246 | 8/2005 |
| KR | 20070021110 | 2/2007 |
| KR | 20070021110 A | 2/2007 |
| KR | 2007028588 | 3/2007 |
| WO | WO-2005/038953 | 4/2005 |
| WO | WO2005038953 | 4/2005 |
| WO | WO-2005/091946 | 10/2005 |

OTHER PUBLICATIONS

Yun, Cho K., Written Opinion of the International Searching Authority, PCT App. No. PCT/US2012/036959 (corresponding to U.S. Appl. No. 13/466,844), (Nov. 23, 2012),1-5.

Yang, Kyung S., International Search Report, PCT App. No. PCT/US2011/062534 (Corresponding to U.S. Appl. No. 13/307,123, (Jul. 24, 2012),1-3.

Yang, Kyung S., Written Opinion of the International Searching Authority, PCT App. No. PCT/US2011/062534 (Corresponding to U.S. Appl. No. 13/307,123, (Jul. 24, 2012),1-3.

Abraham, et al., "A Low Temperature Na-S Battery Incorporating a Soluble S Cathode", *ElectroChimica Acta*, 1978, vol. 23, Pergamon Press Ltd., (Jun. 1, 1978),501-507.

Cullen, Sean P., Non Final Office Action, U.S. Appl. No. 12/205,759, (Apr. 5, 2013),1-17.

Goodenough, J.B. et al., "Fast Na+ -Ion Transport in Skeleton Structures", *Mat. Res. Bull.*, vol. 11, Pergamon Press, Inc. Printed in the United States,(1976),203-220.

Hong, H.Y-P. et al., "Crystal Structures and Crystal Chemistry in the System Na1+xZr2SixP3-x012", *Mat. Res. Bull.*, vol. 11, 1976. Pergamon Press, Inc. Printed in the United States.,(1976),173-186.

(56) References Cited

OTHER PUBLICATIONS

Bentzen, J. J., et al., "The preparation and characterization of dense, highly conductive Na5GdSi4O12 nasicon (NGS)", *Materials Research Bulletin*, vol. 15,(1980),1737-1745.
Delmas, C. et al., "Crystal chemistry of the Na1+xZr2-xLx(PO4)3 (L=Cr, In, Yb) solid solutions", *Materials Research Bulletin*, vol. 16,(1981),285-290.
Von Alpen, V. et al., "Compositional dependence of the electrochemical and structural parameters in the NASICON system (Na1+xSixZr2P3-xO12)", *Solid State Ionics*, vol. 3/4,(1981),215-218.
Fujitsu, S. et al., "Conduction paths in sintered ionic conductive material Na1+xYxZr2-x(PO4)3", *Materials Research Bulletin*, vol. 16,(1981),1299-1309.
Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.
Alamo, J. "Chemistry and properties of solids with the [NZP] skeleton", *Solid State Ionics*, vol. 63-65,(1993),547-561.
Shimazu, K. et al., "Electrical conductivity and Ti4+ ion substitution range in NASICON system", *Solid State Ionics*, vol. 79, (1995),106-110.
Miyajima, Y. et al., "Ionic conductivity of NASICON-type Na1+xMxZr2-xP3O12(M: Yb, Er, Dy)", *Solid State Ionics*, vol. 84,(1996),61-64.
Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.
Sumathipala, et al., "Novel Li+ Ion Conductors and Mixed Conductors, Li3+xSixCr1-xO4 and a Simple Method for Estimating Li+/e-Transport Numbers", *J. Electrochem. Soc.*, vol. 142, No. 7,(Jul. 1995),2138-2143.
Kowalczk, et al., "Li-air batteries: A classic example of limitations owing to solubilities", *Pure Appl. Chem.*, vol. 79, No. 5,(2007),851-860.
Read, "Characterization of the Lithium/Oxygen Organic Electrolyte Battery",*J. Electrochem. Soc.*, vol. 149, No. 9,(2002),A1190-A1195.
Panero, et al., "High Voltage Lithium Polymer Cells Using a PAN-Based Composite Electrolyte", *J. Electrochem. Soc.*, vol. 149, No. 4,(2002),A414-A417.
Dissanayake, et al., "Lithium ion conducting Li4-2xGe1-xSxO4 solid electrolytes", *Solid State Ionics*, 62,(1993),217-223.
Balagopal, et al., "Selective sodium removal from aqueous waste streams with NaSICON ceramics", *Separation and Purification Technology*, 15,(1999),231-237.
Sagane, et al., "Li+ and Na+ transfer through interfaces between inorganic solid electrolytes and polymer or liquid electrolytes", *Journal of Power Sources*, 146,(2005),749-752.
Wang, et al., "LiTi2(PO4)3 with NASICON-type structure as lithium-storage materials", *Journal of Power Sources*, 124,(2003),231-236.
Dissanayake, et al., "New solid electrolytes and mixed conductors: Li3+xCr1-xMxO4: M=Ge, Ti", *Solid State Ionics*, 76,(1995),215-220.
Kerr, "Polymeric Electrolytes: An Overview", *Lithium Batteries: Science and Technology*, Chapter 19, edited by Nazri and Pistoia, Kluwer Academic Publishers,(2004),574-622.
Young, Lee W., International Search Report, PCT Search Report for App. No. PCT/US 07/21978, (Oct. 10, 2008),1-2.
Young, Lee W., Written Opinion of the International Searching Authority, PCT Written Opinion for App. No. PCT/US 07/21978, (Oct. 10, 2008),1-5.
Young, Lee W., International Search Report, PCT Search Report for App. No. PCT/US 08/10435, (Nov. 25, 2008),1-2.
Young, Lee W., Written Opinion of the International Searching Authority, PCT Written Opinion for App. No. PCT/US 08/10435, (Nov. 25, 2008),1-4.
Fu, "Effects of M3+ Ions on the Conductivity of Glasses and Glass-ceramics in the system Li2O-M2O3-GeO2-P2O5 (M=Al, Ga, Y, Dt, Gd, and La)", *Communications of the American Ceramic Society*, vol. 83, No. 4, (Apr. 2000),104-106.
Thokchom, et al., "Superionic Conductivity in a Lithium Aluminum Germanium Phosphate Glass-Ceramic", *Journal of the Electrochemical Society*, 155 (12), (Oct. 8, 2008),A915-A920.
Fu, "Fast Li+ Ion Conducting Glass Ceramics in the System Li2O-Al2O3-TiO2-P2O5", *Science Direct, Solid State Ionics*, vol. 104, Issues 3-4, (Dec. 11, 1997),191-194.
Saienga, et al., "The Comparative Structure, Property, and Ionic Conductivity of LiI+Li2S+GeS2 Glasses Doped with Ga2S3 and La2S3", *Journal of Non-Crystalline Solids*, vol. 354, 14, (Mar. 1, 2008),Abstract.
Wang, et al., "Polymer Composite Electrolytes Containing Active Mesoporous SiO2 Particles", *Journal of Applied Physics*, 102, (2007),1-6.
Wang, et al., "Li1.3Al0.3Ti1.7(PO4)3 Filler Effect on (PEO)LiClO4 Solid Polymer Electrode", *Department of Materials Science and Engineering, Zhejiang University*, (2004),Abstract.
Kim, International Search Report, International App. No. PCT/US2008/084707, (Apr. 29, 2009),1-3.
Kim, Written Opinion of the International Searching Authority, International App. No. PCT/US2008/084707, (Apr. 29, 2009),1-4.
Park, Jin Written Opinion of the International Searching Authority Mailed on Jun. 30, 2009, Int. App. No. PCT/US2008/084572, (Jun. 30, 2009),1-3.
Park, Jin International Search Report Mailed on Jun. 30, 2009, Int. App. No. PCT/US2008/084572, (Jun. 30, 2009),1-3.
Kim, Jun Hak Written Opinion of the International Searching Authority Mailed on Aug. 24, 2009, Int. App. No. PCT/US2009/032458, (Aug. 24, 2009),1-4.
Kim, Jun Hak International Search Report Mailed on Aug. 24, 2009, Int. App. No. PCT/US2009/032458, (Aug. 24, 2009),1-3.
Kim, Yeon-Gyeong PCT International Search Report, Int. App. No. PCT/US2009/056781, (Mar. 2, 2010),1-4.
Kim, Yeon-Gyeong PCT Written Opinion, Int. App. No. PCT/US2009/056781, (Mar. 2, 2010),1-3.
Armand, Michel et al., "ionic-liquid materials for the electrochemical challenges of the future", *Nature Materials*, (Jul. 24, 2009),621-629.
Doyle, Kevin P., et al., "Dentrite-Free Electrochemical Deposition of Li—Na Alloys from an Ionic Liquid Electrolyte", *Journal of the Electrochemical Society*, (May 2006),A1353-A1357.
Kim, K et al., "Electrochemical Investigation of Quaternary Ammonium/Aluminum Chloride Ionic Liquids", *Journal of the Electrochemical Society*, (Jun. 2004),A1168-A1172.
Kim, Ketack et al., "The Role of Additives in the Electroreduction of Sodium Ions in Chloroaluminate-Based Ionic Liquids", *Journal of the Electrochemical Society*, (Dec. 2004),E9-E13.
Lang, Christopher M., et al., "Cation Electrochemical Stability in Chloroaluminate Ionic Liquids", *J. Phys. Chem.*, (2005),19454-19462.
Salminen, Justin et al., "Ionic liquids for rechargeable lithium batteries", *Lawrence Berkeley National Laboratory*, (Sep. 21, 2008),1-19.
Yoshimura, et al., "IPDL Machine Translation of JP-2001-307709", IPDL Machine Translation of JP-2001-307709, (Nov. 2, 2001),1-12.
Totsuka, Kazuhide "IPDL Machine Translation of JP08-321322A", IPDL Machine Translation of JP08-321322A, (Mar. 12, 1996),1-10.
Imanaka, Nobuhito "IPDL Machine Translation of JP 2002-245847 A", IPDL Machine Translation of JP 2002-245847 A, (Aug. 30, 2002),1-6.
Wu, Xian Ming et al., "Preparation and characterization of lithium-ion-conductive Li(1.3)Al(0.3)Tl(1.7)(PO4)3 thin films by the solution deposition", *Thin Solid Films 425*, (2003),103-107.
Parsons, Thomas H., Office Action for U.S. Appl. No. 12/022,381, (May 24, 2011),1-11.
Cantelmo, Gregg Office Action for U.S. Appl. No. 11/944,719, (Dec. 27, 2010),1-8.
Cullen, Sean P., Office Action for U.S. Appl. No. 12/205,759, (Sep. 16, 2010),1-22.
Cullen, Sean P., Office Action for U.S. Appl. No. 12/205,759, (Apr. 13, 2011),1-15.
Kalafut, Stephen J., Office Action for U.S. Appl. No. 11/871,824, (Dec. 10, 2010),1-7.

(56) References Cited

OTHER PUBLICATIONS

Kalafut, Stephen J., Office Action for U.S. Appl. No. 11/871,824, (May 25, 2010),1-8.

Apicella, Karie O., Office Action for U.S. Appl. No. 12/323,165, (Jun. 1, 2011),1-10.

Lee, Kang Young International Search Report, International App. No. PCT/US2010/055718 (Jun. 21, 2011),1-3.

Lee, Kang Young Written Opinion, International App. No. PCT/US2010/055718 (Jun. 21, 2011),1-3.

Park, Jin International Search Report, PCT App. No. US2008/084728 (Corresponding to U.S. Appl. No. 12/323,165, (Jun. 30, 2009),1-3.

Park, Jin Written Opinion of the International Searching Authority, PCT App. No. US2008/084728 (Corresponding to U.S. Appl. No. 12/323,165, (Jun. 30, 2009),1-3.

Inda, Yasushi "Bibliography and Abstract (English Language)", Korean patent application publication KR20040047664, (Jun. 5, 2004),1.

Inda, Yasushi "Bibliography and Abstract (English Language)", Korean Patent Application Publication KR20070028588, (Mar. 12, 2007),1.

Apicella, Karie O., Final Office Action, U.S. Appl. No. 12/323,165, (Sep. 8, 2011),1-11.

Anthony, Julian Non-Final Office Action, U.S. Appl. No. 12/558,363, (Jan. 5, 2012),1-8.

Cullen, Sean P., Non-Final Office Action, U.S. Appl. No. 12/725,319, (Jan. 6, 2012),1-10.

Cullen, Sean P., Final Office Action, U.S. Appl. No. 12/725,319, (Apr. 27, 2012),1-12.

Cho, Jun B., International Search Report, PCT App. No. US2010/027535 (Corresponding to U.S. Appl. No. 12/725,319, (Oct. 20, 2010),1-4.

Cho, Jun B., Written Opinion of the International Searching Authority, PCT App. No. US2010/027535 (Corresponding to U.S. Appl. No. 12/725,319, (Oct. 20, 2010),1-5.

Ryu, et al., "Bibliographical Data and Abstract (English Language)", Application Publication for US2007154814, Corresponding to KR10-0651246, (Aug. 22, 2005),1.

Wiedemann, Eric Supplementary European Search Report, European Patent Application No. 10754004.9 (Corresponding to U.S. Appl. No. 12/725,319, (May 16, 2012),1-6.

Suzuki, et al., "Bibliographical Data and Abstract (English Language)", Japanese Patent application JP62-186470, (Aug. 14, 1987),1-2.

Jang, Sung W., International Search Report, PCT/US2011/046143 Corresponding to U.S. Appl. No. 13/195,431, (Feb. 27, 2012),1-3.

Jang, Sung W., Written Opinion of the International Searching Authority, PCT/US2011/046143 (Corresponding to U.S. Appl. No. 13/195,431, (Feb. 27, 2012),1-3.

Kabe, T. et al., "Hydrodesulfurization and Hydrodenitrogenation", *Wiley-VCH* (1999),37, 110-112.

Task Force on Strat. Uncnv. Fuel, "America's Strategic Unconventional Fuels, Vol. III Resource and Technology Profiles", *America's Strategic Unconventional Fuels, vol. III Resource and Technology Profiles* (completed Feb. 2007, Published Sep. 2007)., Full text available at http://www.unconventionalfuels.org/publications/reports/Volume_III_ResourceTechProfiles(Final).pdf,(Sep. 2007),III-25.

Sonoda, et al., "Bibliographical Data and Abstract (English Translation)", Japanese Patent Application JP-59-75985, (Apr. 28, 1984),1-2.

\* cited by examiner

ALKALI METAL AQUEOUS BATTERY

RELATED APPLICATION

This application claims priority to and the benefit of U.S. Provisional Patent Application Ser. No. 61/372,763 filed Aug. 11, 2010, entitled "Alkali Metal Aqueous Battery." This provisional patent application is expressly incorporated herein by reference.

TECHNICAL FIELD

The present embodiments relate to alkali metal batteries. More specifically, the present embodiments relates to an alkali metal battery having an alkali metal ion-conductive membrane that is protected from incompatible cations found in seawater.

BACKGROUND

Batteries are known and used as a source of power. Typically, a battery cell (or battery) includes an anode and a cathode and one or more reactants at the anode/cathode. During the reaction, an electric voltage is formed by the reaction, which may be collected and used as a power source.

One type of battery that is known involves using lithium as the anode. Such batteries are often referred to as "lithium" batteries. This reaction of lithium may be summarized as follows:

In this reaction, lithium metal is oxidized to the lithium ion. A variety of different types of cathodes may be used in conjunction with the lithium anode. One typical cathode involves using water as the reactant at the cathode, thereby producing hydrogen gas and hydroxide. This cathode reaction may be summarized as follows:

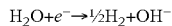

Thus, the overall reaction of this type of lithium battery may be summarized as follows:

or

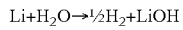

As lithium is consumed at the anode, water is consumed at the cathode while hydrogen is evolved and lithium hydroxide is produced.

The above-recited lithium batteries have been studied for use in underwater or undersea applications. As noted above, the reaction involves consuming water (H$_2$O) at the cathode. Accordingly, seawater or even freshwater may be the water source for the reaction. Such types of batteries are especially desirable to unmanned undersea vehicles, which are useful for data gathering, taking measurements under the ocean, etc. Advantages of using these types of lithium batteries in undersea applications are that they are lightweight, provide natural buoyancy (as lithium is lighter than water) and are relatively silent in their operation.

There are, however, some known disadvantages associated with the use of lithium batteries in underwater applications. The lithium battery includes a lithium ion-conductive membrane. This membrane is used as the membrane that separates the anode from the water in the cathode. This lithium ion-conductive membrane is designed to allow lithium ions to pass through the membrane (e.g., from the anode to the cathode). Such lithium ion-conductive membranes contain a quantity of lithium ions. Such lithium ion-conductive membranes are known to fail, over time, when they are contacted with sodium ions (which are found, in significant quantities, in seawater). More specifically, the mobile lithium ions in the ion-conductive lithium membrane may exchange with the sodium ions in an aqueous (seawater) phase. This exchange can be undesirable because the lattice structure of the ion-conductive membrane may expand as the larger sodium ions replace the smaller lithium ions in the lattice. This expansion may result in distortion and stress of the ion-conductive membrane which may result in fracture and ultimately failure of the battery. This problem is especially prevalent where seawater is used as the water source because this water quantity already contains a significant quantity of sodium ions dissolved therein.

Accordingly, there is a need in the art for a new type of lithium battery that will not have the lithium ion-conductive membrane be fouled by sodium ions dissolved in seawater. Such a battery is disclosed herein.

SUMMARY

The present embodiments relate to a battery, such as a lithium battery, that is especially applicable for underwater/undersea applications. (Other applications are also possible). Specifically, the battery is designed such that it will allow water to enter the system to replenish the water that has been consumed in the galvanic reaction. At the same time, the battery includes a protective exchange membrane that allows water to enter the cell. The membrane is also designed to allow operation of the battery (1) in freshwater applications where there is low ion-conductivity within the water and (2) in seawater where there is a quantity of ions that are incompatible with the ion-conductive membrane used in the cell. More specifically, the battery is designed such that the membrane protects (shields) the alkali metal conductive membrane from being fouled by ions (such as sodium ions) found in seawater.

In one example, the battery is a galvanic cell. This galvanic cell is comprised of an alkali metal or alkali metal alloy anode. (The alkali metal or alkali metal anode may be lithium, lithium alloys, sodium and/or sodium alloys.) A substantially nonpermeable alkali metal conductive membrane is also added to the cell. If the alkali metal is lithium or a lithium alloy, then the alkali metal ion conductive membrane may be a membrane that conducts lithium ions (such as LiSICON). If the alkali metal is sodium or a sodium alloy, then the alkali metal ion conductive membrane may be a membrane that conducts sodium ions (such as NaSICON). A cathode compartment containing a hydrogen evolving cathode and an aqueous catholyte is also added to the cell. The aqueous catholyte includes at least one dissolved salt comprising cations of the alkali metal. The cell further comprises a zone where hydrogen may vent from the catholyte into the environment and a zone where water may transport into the catholyte from the environment via a membrane. The zone where water may ingress into the catholyte may further be designed to restrict the transport of ions through the membrane. In some embodiments, the zone where water may transport into the catholyte from the environment and which restricts the transport of ions comprises a membrane that is one of a bipolar membrane, an ion exchange membrane, an anion exchange membrane, an ultrafiltration membrane and/or a nanofiltration membrane.

DETAILED DESCRIPTION

Figure 1:
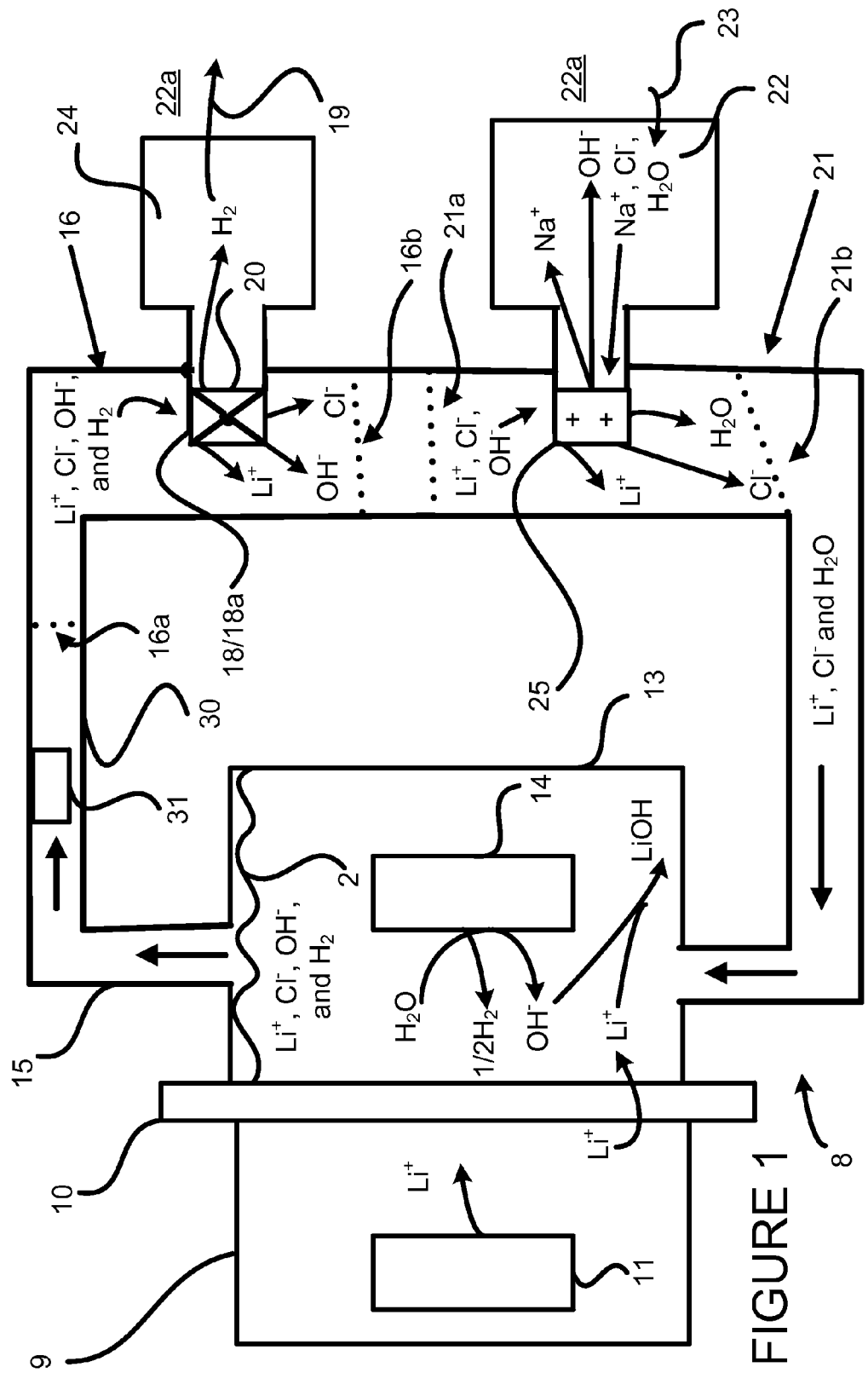
FIG. 1 is a schematic of a battery according to the present embodiments.

As explained above, the present embodiments relate to a battery, such as a lithium battery, that may be used with salt water (seawater), wherein the ion-conducting membrane required for battery operation will not be fouled by the sodium ions dissolved in the seawater. Referring now to FIG. 1, a schematic example of a battery 8 according to the present embodiments is shown. The battery 8 includes an anode 11 that is housed within an anode compartment 9. A cathode 14 is also used as part of the battery 8. The cathode 14 is housed within a cathode compartment 13. As with other batteries known in the art, the battery 8 is designed such that it may produce a voltage when reactions occur at the cathode 14 and the anode 11. This voltage may then be captured and used to provide electrical power. As noted above, the battery 8 may be particularly well-suited for applications such as underwater vessels, such as unmanned underwater vehicles, floating beacons in water, offshore oil rigs, etc.

The anode 11 may be made of lithium metal. Those skilled in the art will appreciate that this type of electrode may comprise pure lithium metal or may comprise alloys of lithium. Thus, as shown in FIG. 1, when a reaction occurs at the anode 11, positively-charged lithium ions ($Li^+$) are produced. During this reaction, a quantity of electrons ($e^-$) may also be produced, which may be collected by an anode current collector or electric lead (not shown in FIG. 1) and used for the reduction reaction at the cathode 14. The lithium metal used at the anode 11 may be enclosed by a flexible, water impermeable casing such as a composite polymer with a metalized coating or layer. Those skilled in the art would appreciate how to construct the anode 11 from lithium metal or an alloy of lithium.

The cathode 14 may be housed within the cathode compartment 13. The cathode 14 may be constructed of an electronically conductive material with low overpotential for hydrogen evolution such as nickel or platinized metal such as titanium or nickel. The cathode 14 may be a mesh material, a perforated plate, or, in other embodiments, the cathode 14 may take some other form. Again, those skilled in the art would appreciate how to construct the cathode 14. The reaction that occurs at the cathode 14 involves the reduction of water (using the electrons formed by the lithium reaction in the anode compartment 9) to produce hydrogen gas ($H_2$) and the hydroxide anion ($OH^-$). The cathode compartment 13 may be substantially filled with an aqueous solution of a lithium salt. The salt may include but is not limited to lithium chloride (LiCl), lithium hydroxide (LiOH) or combinations thereof. The aqueous solution within the cathode compartment 13 is referred to as the catholyte 2.

A lithium ion-conductive membrane 10 operates to separate the lithium anode 11 (and the anode compartment 9) from the cathode chamber 13. The lithium ion-conductive membrane 10 may be one of many known membranes, such as membrane made from the commercially available LiSICON material. Other materials used to construct the membrane may include a lithium-ion-conductive glass ceramic material. LiSICON is a class of lithium conductive ceramics which include: $Li_{2+2x}Zn_{1-x}GeO_4$ (−0.36<x<0.87), $Li_{14}ZnGe_4O_{16}$, and slight variations in stoichiometry and with amounts of cation substitution. In this application, LiSICON also includes the lithium aluminum titanium phosphate family of compositions including, but not limited to, ceramic membranes having the formula $Li_{1+x}Al_xTi_{2-x}(PO_4)_3$, where x is between 0.0 and 0.5; and $Li(1+x+4y)Al_xTi(1-x-y)(PO4)_3$ where x and y are between 0.0 and 0.5 and where slight or partial substitutions of cations may be made to improve properties. For example, in different embodiments, zirconia and/or silica may be fully or partially substituted for aluminum and titanium. The lithium-ion-conductive glass ceramic may include but are not limited to compositions in the lithiumaluminosilicate glass ceramics family as well as ceramics in the $Li_{1.5}Al_{0.5}Ge_{1.5}$ $(PO_4)_3$-$xLi_2O$ (x=0.0-0.20) family. It is understood that partial substitutions of one or more of the elements with another element may improve a material characteristic for either LiSICON or the glass ceramic material. These materials having partials substations fall within the scope of the present embodiments.

The aqueous solution of the lithium salt (catholyte 2) that is found in the cathode compartment 13 is compatible with the lithium ion-conducting membrane 10. As shown in FIG. 1, the membrane 10 may be designed such that lithium ions (such as the lithium ions formed at the anode 11) may pass through the membrane 10 and enter the cathode compartment 13. Once in the cathode compartment 13, these cations may mix with the other ions in the cathode compartment 13 to form quantities of aqueous LiOH (or LiCl).

As shown in FIG. 1, water ($H_2O$) is consumed in the chemical reaction occurring in the cathode compartment 13. Accordingly, if the water content of the cathode compartment 13 is not replenished, the battery 8 will fail and will no longer be capable of providing an electrical voltage. As explained above, if seawater (containing dissolved quantities of sodium chloride) is used to replenish the water content in the cathode compartment 13, care must be taken to ensure that the sodium ions found in the seawater do not contact the membrane 10 (and thereby foul the membrane 10). Thus, the present embodiments (as described herein) are designed to protect the membrane 10 and prevent any sodium ions from contacting the membrane 10, even if seawater is used as the water-replenishing source. Thus, the present embodiments, unlike previously-known batteries, may be used freely with seawater without having the seawater foul the membrane 10 within the battery 8.

In order to protect the membrane 10 from sodium ions, a flow channel 15 is provided. The flow channel 15 is in fluid communication with the cathode compartment 13. The flow channel 15 is designed such that a portion of the aqueous solution (catholyte 2) found in the cathode compartment 13 (which includes lithium ions, chloride ions, hydroxide ions, and hydrogen gas), may exit the cathode compartment 13 by flowing through the flow channel 15. It should be noted that the flow channel 15 may be within the same housing that houses the anode compartment 9 and the cathode compartment 13 (e.g., the housing or other wall of the battery). Other embodiments may be constructed in which the flow channel 15 may be outside of the battery housing that houses the anode compartment 9 and the cathode compartment 13.

The aqueous solution (catholyte 2) found in the cathode compartment 13 (which includes lithium ions, chloride ions, hydroxide ions, and hydrogen gas) is in fluid communication with the cathode 14. In fact, the catholyte 2 is at least partially housed within the cathode compartment 13. However, the catholyte 2 may be allowed to enter the flow channel 15 and subsequently enter a first zone 16. For purposes of illustration, the first zone 16 is delineated in FIG. 1 by dashed lines 16a and 16b. In some embodiments, the first zone 16 may be an actual chamber or compartment that is separate from the cathode compartment 13 or the flow channel 15. In other embodiments, the first zone 16 may simply be a zone, region or area of the flow channel 15 or the cathode compartment 13.

The first zone 16 may be a gas release zone that allows the hydrogen gas (which is part of the catholyte 2) to be vented off into the environment 22a. For this reason, the first zone 16 may be referred to as a "hydrogen-egress zone." More specifically, the first zone 16 includes at least one surface 18 that is positioned so that the catholyte may contact it. This surface 18 may be part of a membrane 18a, plate or other similar feature. (More than one surface 18 and/or more than one membrane 18a may be used, as desired.) This surface 18 may be comprised of a hydrophobic gas venting material 20. Examples of a suitable material that may be used for the material include polymers that are hydrophobic such as porous or microporous polytetrofluoroethylene. (Examples of porous or microporous polytetrofluoroethylene are sold under the trademark Gortex®.) The material 20 is designed to allow hydrogen gas ($H_2$) to vent out of the first zone 16 into the environment 22a while containing the other substances of the catholyte 2 (namely water, lithium ions, chloride ions, and hydroxide ions) within the first zone 16. Thus, the chloride ions, lithium ions, hydroxide ions cannot pass through the surface 18 while the hydrogen gas passes through the surface 18 and is vented off (as shown by arrow 19) into the environment 22a. (If the battery 8 is used in undersea applications, the hydrogen gas may be vented off into the ocean). Those skilled in the art will appreciate how to construct structure(s) sufficient to vent the hydrogen gas into the environment 22a after it passes through the surface 18. In some embodiments, the gas may be vented off into chamber 24 and then distributed to the environment 22a, as shown by arrow 19.

Any material that is substantially permeable to hydrogen gas but is substantially impermeable to water and dissolved ionic salts may be used as the material 20. Further examples of the materials that may be used as the material 20 include polypropylene, polyethylene, polymers and/or other substances.

After the hydrogen gas has been vented off from the catholyte 2, the other substances of the catholyte 2 (namely, the lithium ions, hydroxide ions, water, and/or chloride ions) may exit the first zone 16. After exiting the first zone, these substances may flow into a second zone 21. As with the first zone 16, the second zone 21 may be a separate compartment or chamber of the flow channel 15 and/or the cathode compartment 13, or may simply be another zone, region or area of the flow channel 15/cathode compartment 13. For purposes of illustration, the second zone 21 is delineated in FIG. 1 by dashed lines 21a and 21b. The second zone 21 is shown as being downstream from the first zone 16, but other embodiments may be made in which the second zone 21 is upstream of the first zone 16.

The second zone 21 may be a water-ingress zone. Specifically, the second zone 21 includes one or more membranes 25. The membranes 25 are designed such that lithium ions, which are found in the catholyte 2, cannot pass through the membrane 25. Thus, the lithium ions remain in the catholyte 2. However, the membrane 25 is designed such that a quantity of water ($H_2O$) from the environment 22a may pass through the membrane 25 and enter the catholyte 2. Thus, by allowing water to enter the catholyte 2, the second zone 21 allows for the replenishment of the water molecules that were consumed in the cathode reaction.

As noted above, the source of the water that enters the catholyte 2 may be seawater that contains a quantity of dissolved salts, such as sodium chloride. Those skilled in the art would appreciate how seawater could be added from the environment 22a (such as, for example, added into a chamber 22 as shown by arrow 23) and then allowed to contact the membrane 25. In some embodiments, the quantity of seawater in the chamber 22 may be constantly replenished/replaced. The membrane 25 is designed such that it prevents the ingress of sodium cations from the seawater. In other words, the sodium ions cannot pass through the membrane 25 (and are thus prevented from entering the catholyte 2.) The membrane 25 may further be designed to prevent the egress of lithium cations from the catholyte 2. The membrane 25 does allow the ingress of water into the catholyte 2.

An example of a type of material that may be used for the membrane 25 is an anion exchange membrane (if the alkali metal in the catholyte is sodium or lithium). The anion exchange membrane (which is represented by the "+" signs in the membrane 25) repels positively charged species and does not allow positively-charged ions, such as lithium or sodium ions, to pass through the membrane 25. Thus, as shown in FIG. 1, the sodium ions are trapped on the outside of the membrane while the lithium ions are trapped on the inside of the membrane 25. Water, which is a neutral species, can pass through the anion exchange membrane 25. The water may pass through the membrane under the force of osmotic pressure that is applied to the second zone 21.

The anion exchange membrane 25 may have an additional desirable feature. Hydroxide anions ($OH^-$) would be expected to egress from the catholyte 2 (through the membrane 25) and chloride anions ($Cl^-$) would be expected to ingress to the system. Thus, the formed lithium hydroxide (e.g., formed from the reaction at the cathode 14) is replaced with lithium chloride. This combination of lithium ions, chloride ions and water may then exit the second zone 21 and be returned to the cathode compartment 13 for further reactions, etc.

It should be noted that the embodiment of FIG. 1 shows a single membrane 25 that operates to allow water and chloride ions to ingress and allows hydroxide ions to egress. Other embodiments may be designed in which there is a first membrane that allows water to ingress and then a second membrane which allows the chloride ions to replace the hydroxide ions.

There are some membranes (such as some of the membranes from the family $Li_{(1+x+4y)}Al_xTi_{(1-x-y)}(PO_4)_3$ where x and y are between 0.0 and 0.5) which have been found to be compatible with lithium hydroxide solutions but not with lithium chloride solutions. Accordingly, embodiments may be constructed that incorporate such membranes which will permit the ingress of water through the membrane but will prevent the transport of either anions or cations.

The embodiments of the battery 8 may be designed in which the one or more membranes 25 comprise a bipolar ion exchange membrane or an anion exchange membrane laminated to or in combination series with one or more cation exchange membranes. Another possibility may be to utilize membranes of the class with pores small enough to permit transport of water but substantially prevent the transport of ions. Membranes such as the GE Osmonics membranes or other ultrafiltration, and nanofiltration are in this category. Accordingly, such materials could be used as the membrane 25.

Further, although the embodiment of FIG. 1 illustrates the zones 16, 21 as being separate, an embodiment may be constructed in which a single zone (or chamber) combines the function of venting hydrogen and allowing ingress of water. Such an embodiment may be designed in which the single zone includes a length of finely porous material that prevents transport of ions, thereby protecting the ion-conducting membrane 10 from contacting incompatible cations. In other words, it is possible to make an embodiment where the first and second zones 16, 21 are one combined zone.

It should be noted that there are significant advantages associated with the battery 8 shown in FIG. 1. For example, natural circulation is promoted within the fluid path defined within the structure of FIG. 1 based upon the formation of the hydrogen gas in the cathode compartment 13. More specifically, this formed gas, which has a natural buoyancy that is lighter than water, drives catholyte 2 to circulate through the fluid path. In essence, this buoyancy provides "natural pumping" action while the battery is being operated. However, it is understood that other embodiments may be designed in which a pump, such as a centrifugal or peristaltic or other pump, may be added to the system to further assist in pumping the catholyte 2 through the fluid path.

Figure 5:
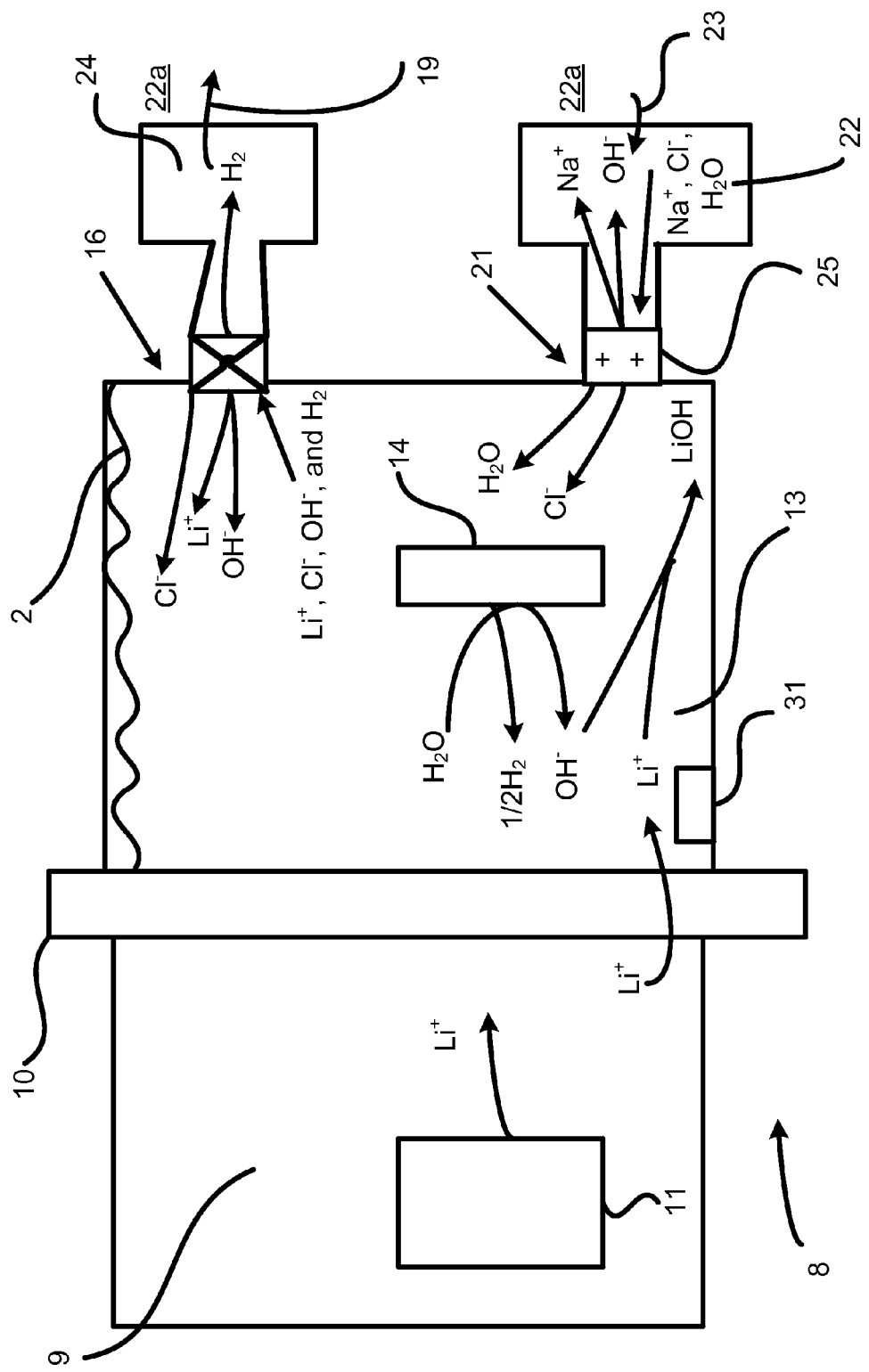
FIG. 5 is a schematic of another example of a battery according to the present embodiments.

While FIG. 1 shows the elements of the battery 8 interconnected with a catholyte fluid pathway, it is also understood that another embodiment of this invention may have the first zone 16 and the second zone 21 be integrated directly within the cathode compartment 13. In such embodiments, the fluid channel 15 may not be necessary. This type of embodiment is illustrated in FIG. 5.

In some embodiments, it may be desirable to have a larger cross-sectional area flow path in the hydrogen-egress zone 16 (e.g., the area where the catholyte and hydrogen are present) and have a reduced cross-sectional area flow path in the water-ingress zone 21. In other words, it may be desirable to have a reduced cross-sectional area flow path in the area of the flow that is downstream of where the hydrogen was vented). Such differences in cross-sectional area may be useful in promoting hydrogen egress and water ingress. FIG. 1 shows, for purposes of clarity, the same cross-sectional area in both the first and second zones 16, 21. However, as noted above, different cross-sectional areas within the flow channel 15 may be desirable in some embodiments.

Embodiments may also be constructed in which there are one or more volume expansion/contraction members in the walls of the fluid path (such as, for example, in the channel 15) since static pressure, osmotic pressure and cell discharge rate may influence the volume of the catholyte/gas mixture. More specifically, embodiments may be constructed in which there is a member 31 that can expand or contract in volume and that this member 31 is positioned in fluid path. This member 31 may be added to the walls 30 of the flow channel 15 or otherwise positioned within the fluid flow path (such as in the cathode compartment 13, in the first zone 16, in the second zone 21, etc.). Only one (1) member 31 is shown in FIG. 1, but more than one expansion/contraction member 31 may be used. The expansion/contraction member(s) 31 may be in fluid communication with the cathode compartment 13 and may be designed to expand or contract in volume in order to adjust for changes in pressure associated with the flow of the fluid. As noted above, static pressure, osmotic pressure and cell discharge rate may influence the volume of the catholyte/gas mixture. Thus, the expansion/contraction member(s) 16 may be designed to adjust the pressure of the fluid in the fluid path and/or optimize the egress of hydrogen gas from the catholyte 2 and/or the ingress of water into the catholyte 2.

Figure 2:
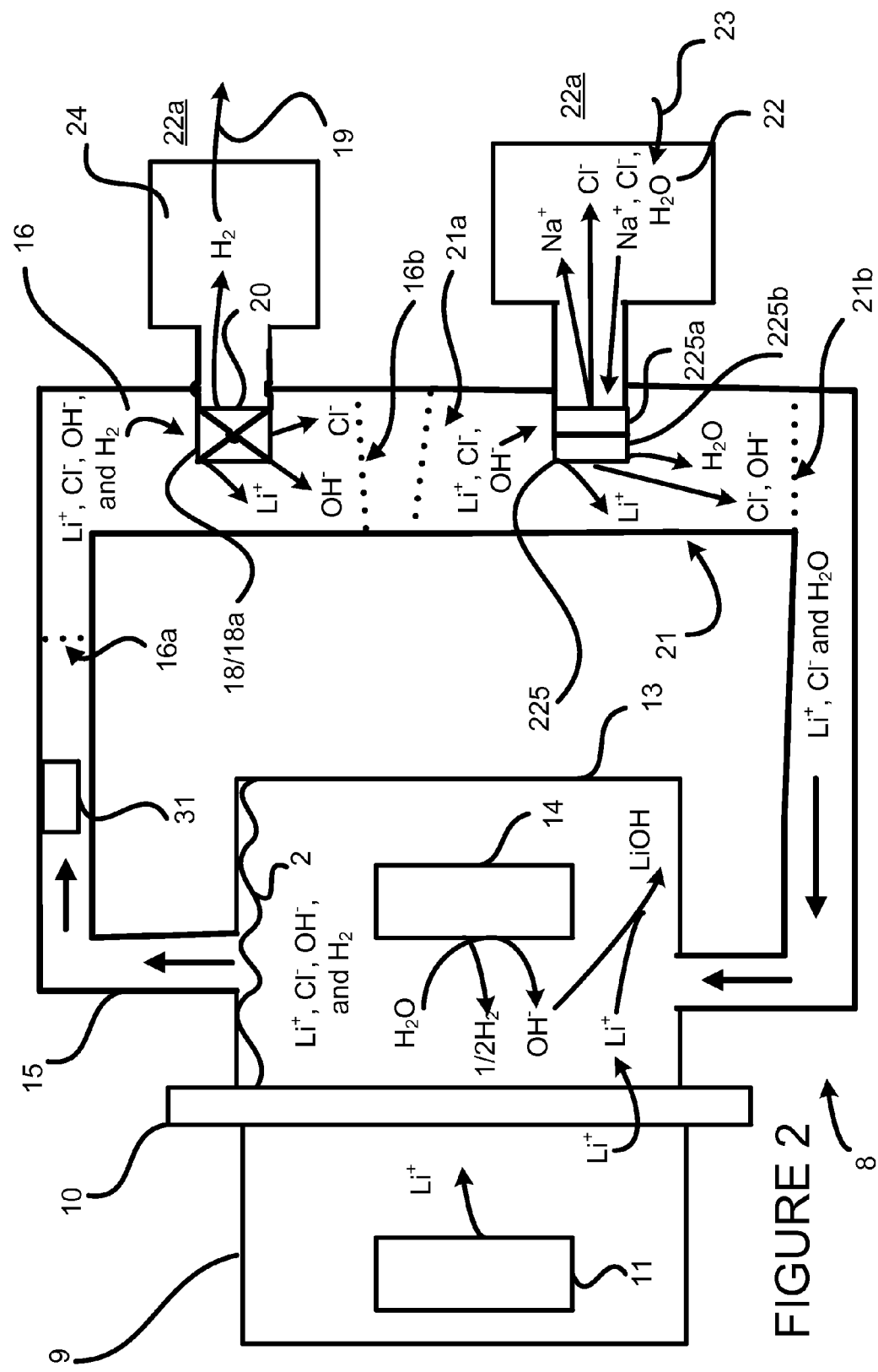
FIG. 2 is a schematic of another example of a battery according to the present embodiments.

Referring now to FIG. 2, another embodiment of a battery 8 is shown. The battery of FIG. 2 is similar to that which was shown in FIG. 1 except that in FIG. 2, the membrane 25 has been replaced with a different type of membrane, namely membrane 225. Specifically, the membrane 25 of FIG. 1 is an anion exchange resin that prevents sodium from passing through the membrane, but allows water (a neutral species) and anions (such as chloride and hydroxide) to pass through the membrane 25. However in the embodiment of FIG. 2, the membrane 225 comprises two distinct membranes, an anion exchange membrane 225a and a cation exchange membrane 225b. (This type of membrane may be referred to as a "bipolar membrane.") The membranes 225a, 225b will allow water (a neutral species) to pass through. Thus, as shown in FIG. 2, water is still allowed to ingress through the membrane 225 to replenish the water consumed in the cathode compartment 13. However, the anion exchange membrane 225a prevents all positively-charged species (such as lithium or sodium ions) from passing through the membrane 225. Likewise, the cation exchange membrane 225b prevents all negatively-charged species (such as hydroxide ion and chloride ions) from passing through the membrane 225. Thus, only water is allowed to pass through the membrane 225. In this embodiment, the hydroxide ions will not be replaced by the chloride ions. However, the system still allows for the replenishment of water. Other combinations of membranes, similar to that which is shown in FIG. 2, may also be used.

Figure 3:
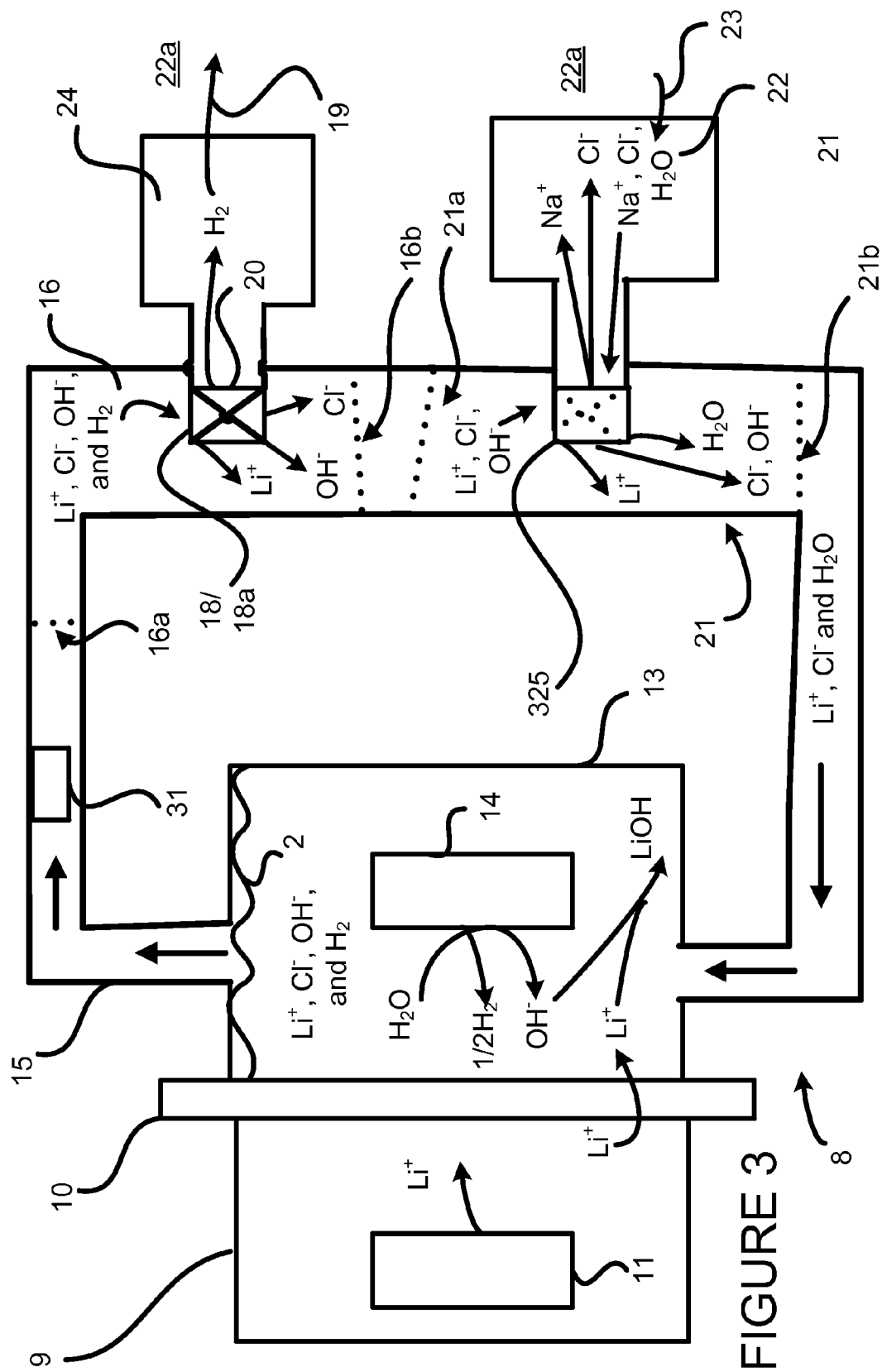
FIG. 3 is a schematic of another example of a battery according to the present embodiments.

Referring now to FIG. 3, another embodiment of a battery 8 is shown. The battery of FIG. 3 is similar to that which was shown in FIG. 1 except that in FIG. 3, the membrane 25 has been replaced with a different type of membrane, namely membrane 325. The membrane 325 is a nanofiltration membrane having pores large enough to permit transport of water but substantially small enough to prevent the transport of ions (either positive or negative ions). These membranes may be referred to as GE Osmonics membranes or other ultrafiltration and/or nanofiltration membranes. Thus, in the embodiment of FIG. 3, only water is allowed to pass through the membrane 325. In this embodiment, the hydroxide ions will not be replaced by the chloride ions.

Figure 4:
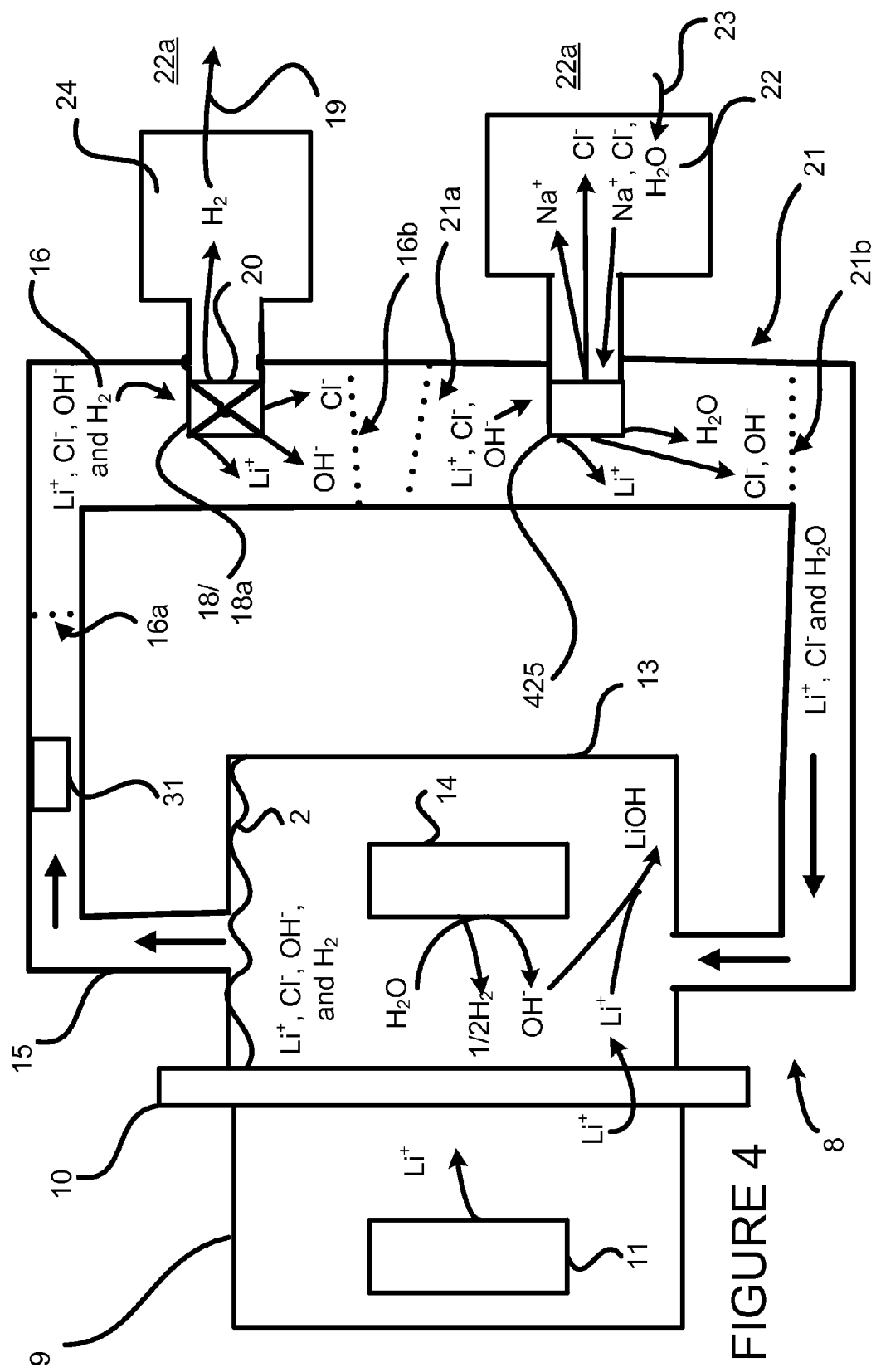
FIG. 4 is a schematic of another example of a battery according to the present embodiments.

Referring now to FIG. 4, another embodiment of a battery 8 is shown. The battery of FIG. 4 is similar to that which was shown in FIG. 1 except that in FIG. 4, the membrane 25 has been replaced with a different type of membrane, namely membrane 425. The membrane 425 may comprise one or more surface charges (such as, for example, by having cations grafted to the surface of the membrane 425.) These types of membranes are commercially available and would allow water to pass through the membrane 425, but may not allow other ions to pass through the membrane. These functional groups can operate to reject the polarity of the ions, and only allow neutral species to pass through. These membranes, which are commercially available, are referred to herein as "functional group membranes." In this embodiment, the hydroxide ions and chloride ions cannot pass through the membrane and thus the hydroxide ions will not be replaced by the chloride ions. However, other embodiments may also be designed in which the membrane(s) have surface charges/functional groups that will allow the hydroxide ions to be replaced by the chloride ions.

Referring now to FIG. 5, another embodiment of a battery 8 is shown. The battery 8 of FIG. 5 is shown incorporating the membrane 25 of FIG. 1. However, other embodiments may also be constructed in which other membranes (such as membranes 225, 325, or 425) are incorporated in the embodiment of FIG. 5.

The embodiment shown in FIG. 5 is designed such that the first zone 16 (e.g., the hydrogen-egress zone) and the second zone 21 (e.g., the water-ingress zone) are not separate chambers, nor are they part of a flow channel. Rather, the zones 16, 21 are simply areas of the cathode compartment 13. Other embodiments may be designed in which the zones 16, 21 are simply areas or regions of another chamber and/or regions/areas of a flow channel (such as flow channel 15). Also, in the embodiment shown in FIG. 5, the expansion/contraction member 31 is positioned within the cathode compartment 13.

In the above-recited embodiments, the anode 11 was made of lithium (or lithium alloys) and the embodiments were designed to prevent sodium cations from exchanging into the lithium conductive membrane 10. Embodiments may also be designed in which sodium (or alloys of sodium) is the metal used at the anode 11. Such embodiments will also provide a structure to vent hydrogen and provide for ingress of water into the catholyte 2. Thus, another embodiment is designed in which a sodium or sodium alloy anode is utilized and a sodium conductive membrane is utilized between the anode 11 and the cathode compartment 13. Examples of sodium conductive membrane include NaSICON compositions that may include but are not limited to Na3Zr2Si2PO12, Na1+xSixZr2P3−xO12 (x from 1.6 to 2.4), Y-doped Nasicon (Na1+x+yZr2−yYySixP3−xO12, Na1+xZr2−yYy SixP3−xO12−y, where x=2, y=0.12) and Fe-doped Nasicon (Na3Zr2/3Fe4/3P3O12).

It is understood that the battery cell described in the invention may operate in any aqueous environment including seawater, brackish water, and fresh water.

Referring now to FIGS. 1-5 generally, the present embodiments may also work in freshwater as well as seawater. One of the problems associated with prior lithium batteries, when used in freshwater, is that freshwater lacks a quantity of conductive ions. Accordingly, in prior batteries, if freshwater was allowed to enter the system, the concentration of the ions in the catholyte 2 (e.g., the solution of $Li^+$, $Cl^-$ and $OH^-$) in the battery would diminish over time (as freshwater entered the system), thereby causing the battery operation (after a certain period of time) to fail. However, as can be seen by FIGS. 1-5, the present embodiments may be designed such that, even if freshwater is allowed to enter the system (such as through membranes 25, 225, 325, and/or 425), the concentration of ions still remains high in the catholyte 2. Specifically, the lithium ions ($Li^+$) do not exit the catholyte 2 in the present embodiments; rather, the lithium ions (and their corresponding negatively-charged anions) remain in the catholyte 2. Such ions in the catholyte 2 will move, as needed, during the operation of the battery 8. Accordingly, the battery 8 will also have a concentration of ions in the catholyte 2 necessary to operate the battery 8, regardless of whether the battery 8 is being used in freshwater or seawater.

The ability of the present embodiments to operate in either freshwater or seawater provides a significant advantage. The present embodiments may even operate in a system that moves from salt water to freshwater or vice versa. For example, the present batteries 8 could be used in an undersea vehicle that is deployed in seawater and then moves into freshwater (such as by moving the undersea vehicle from the ocean into a river that flows into the ocean). Likewise, the present batteries 8 could be used in an undersea vehicle that is deployed in freshwater (such as in a river) and then moves into seawater (as the river water flows into the ocean). Accordingly, the fact that the present batteries 8 may be used in both freshwater and seawater gives the owner of the battery added flexibility when he/she is deploying their undersea vehicles.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A battery comprising:
   an anode comprising an alkali metal or an alkali metal alloy;
   a hydrogen gas producing cathode;
   an alkali metal conductive membrane that separates the anode from the cathode, wherein the alkali metal conductive membrane is impermeable to water;
   an aqueous catholyte comprising cations of the alkali metal, wherein the catholyte is in fluid communication with the cathode;
   a hydrogen-egress zone, wherein hydrogen produced at the cathode may vent out of the catholyte and out of the battery via the hydrogen-egress zone; and
   a water-ingress zone, wherein water from an environment outside the battery may ingress into the catholyte via the water-ingress zone, wherein the water-ingress zone restricts the ingress of cations dissolved in the water into the catholyte.

2. The battery as claimed in claim 1, wherein the alkali metal or the alkali metal alloy comprises lithium or a lithium alloy and the alkali metal conductive membrane comprises LiSICON.

3. The battery as claimed in claim 1, wherein the alkali metal or the alkali metal alloy comprises sodium or a sodium alloy and the alkali metal conductive membrane comprises NaSICON.

4. The battery as claimed in claim 1, wherein the hydrogen-egress zone comprises a membrane constructed of a hydrophobic material that is capable of allowing hydrogen gas to vent out of the catholyte.

5. The battery as claimed in claim 4, wherein the hydrophobic material comprises microporous polytetrofluoroethylene.

6. The battery as claimed in claim 1, wherein the anode is housed within an anode compartment and the cathode is housed within a cathode compartment, wherein the alkali metal conductive membrane separates the anode compartment from the cathode compartment, wherein the catholyte is housed, at least partially, within the cathode compartment.

7. The battery as claimed in claim 1, wherein the water-ingress zone comprises a membrane that allows water to ingress into the catholyte.

8. The battery as claimed in claim 7, wherein the membrane in the water-ingress zone comprises an anion exchange membrane.

9. The battery as claimed in claim 7, wherein the membrane in the water-ingress zone comprises an ultrafiltration membrane or a nanofiltration membrane.

10. The battery as claimed in claim 8, wherein the membrane in the water-ingress zone further comprises a cation exchange membrane.

11. The battery as claimed in claim 7, wherein the membrane in the water-ingress zone comprises a functional group membrane.

12. The battery as claimed in claim 1, wherein the hydrogen-egress zone and the water-ingress zone are regions of the same compartment.

13. The battery as claimed in claim 1, wherein the hydrogen-egress zone and the water-ingress zone are part of a flow channel that is in fluid communication with the cathode compartment.

14. The battery as claimed in claim 1, further comprising at least one expansion/contraction member that can expand or contract in volume.

15. The battery as claimed in claim 1, wherein hydroxide and chloride anions are prevented from passing through the water-ingress zone.

16. The battery as claimed in claim 1, wherein hydroxide and chloride anions may pass through the water-ingress zone.

17. The battery as claimed in claim 1, wherein the water-ingress zone restricts the egress of cations of the alkali metal from out of the catholyte.

18. A battery comprising:
- an anode comprising lithium or a lithium alloy;
- an anode compartment that houses the anode;
- a hydrogen gas producing cathode;
- a cathode compartment that houses the cathode;
- a LiSICON membrane that separates the anode compartment from the cathode compartment, wherein the LiSICON membrane is impermeable to water;
- an aqueous catholyte comprising lithium cations, wherein the catholyte is in fluid communication with the cathode, wherein the catholyte is housed, at least partially, within the cathode compartment;
- at least one expansion/contraction member that can expand or contract in volume, wherein the at least one expansion/contraction member is in fluid communication with the catholyte;
- a hydrogen-egress zone, wherein hydrogen produced at the cathode may vent out of the catholyte and out of the battery via the hydrogen-egress zone; and
- a water-ingress zone, wherein water from an environment outside the battery may ingress into the catholyte via the water-ingress zone, wherein the water-ingress zone restricts the egress of the lithium cations, wherein the water-ingress zone also restricts the ingress of cations dissolved in the water into the catholyte.

19. A method for protecting an alkali metal conductive membrane in a battery from fouling due to incompatible ions in a water supply, the method comprising:
- obtaining a battery, wherein the battery comprises
  - an anode comprising an alkali metal or an alkali metal alloy;
  - a hydrogen gas producing cathode;
  - an alkali metal conductive membrane, wherein the alkali metal conductive membrane separates the anode from the cathode and is impermeable to water;
  - an aqueous catholyte comprising cations of the alkali metal, wherein the catholyte is in fluid communication with the cathode;
- obtaining a hydrogen-egress zone, wherein hydrogen produced at the cathode may vent out of the catholyte and out of the battery via the hydrogen-egress zone; and
- obtaining a water-ingress zone, wherein water from an environment outside the battery may ingress into the catholyte via the water-ingress zone, wherein the water-ingress zone restricts the ingress of incompatible ions dissolved in the water such that the incompatible ions are prevented from contacting the alkali metal conductive membrane, wherein the water-ingress zone also restricts the egress of cations of the alkali metal.

* * * * *